United States Patent [19]
Ikeda

[11] 3,881,804
[45] May 6, 1975

[54] COMPACT ANGLE FINDER WITH ADJUSTABLE MAGNIFYING LENS SYSTEM

[75] Inventor: Yoshitsugu Ikeda, Hachioji, Tokyo, Japan

[73] Assignee: Olympus Optical Company Limited

[22] Filed: May 16, 1973

[21] Appl. No.: 360,949

[30] Foreign Application Priority Data
May 23, 1972 Japan.............................. 47-50985

[52] U.S. Cl. ..................... 350/49; 350/39; 354/224
[51] Int. Cl. ........................................... G02b 23/14
[58] Field of Search ......... 350/25, 49, 39; 88/1.5 R; 354/223-225

[56] References Cited
UNITED STATES PATENTS
| | | | |
|---|---|---|---|
| 1,553,211 | 9/1925 | Barr et al. | 350/39 X |
| 1,975,302 | 10/1934 | Albada | 350/49 X |
| 2,068,829 | 1/1937 | Albada | 350/49 X |
| 2,552,940 | 5/1951 | Cornut | 88/1.5 NR |
| 2,862,417 | 12/1958 | Baker et al. | 350/49 X |
| 2,901,943 | 9/1959 | Tackaberry | 350/39 X |

*Primary Examiner*—David H. Rubin

[57] ABSTRACT

A compact angle finder with an adjustable magnifying lens system incorporated therein, which is arranged at the rear of an eyepiece of a single-lens reflex camera finder and consists of a Galilean type rotatably adjustable magnifying lens system, an objective lens system including an air space in which is disposed a reflecting member, and an eyepiece lens system, and in which an entrance pupil of said adjustable magnifying lens system substantially coincides with an exit pupil of said eyepiece of the single-lens reflex camera finder, an exit pupil of said adjustable magnifying lens system is located within a range which is about one-half the overall length of said adjustable magnifying lens system from the center of rotation thereof and at the same time said exit pupil coincides with an entrance pupil of a lens system consisting of said objective lens system and said eyepiece lens system.

3 Claims, 4 Drawing Figures

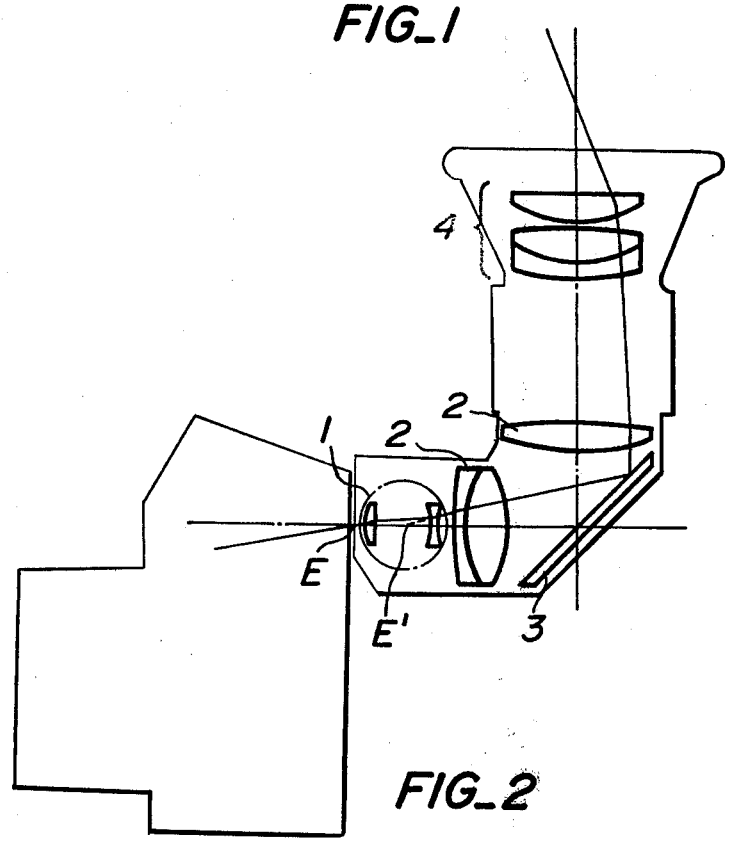
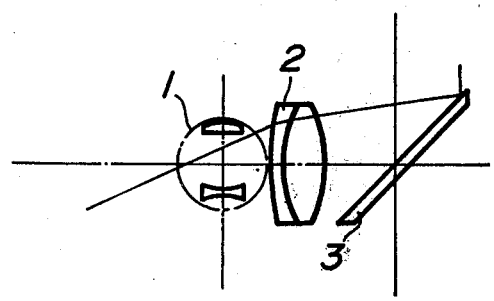

FIG_3a
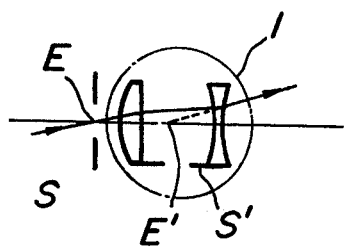
FIG_3b
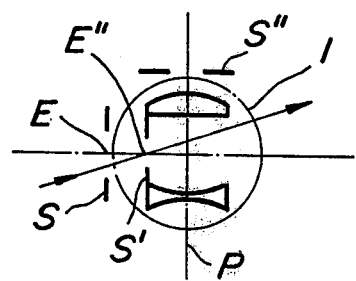

COMPACT ANGLE FINDER WITH ADJUSTABLE MAGNIFYING LENS SYSTEM

This invention relates to an angle finder with an adjustable magnifying lens system incorporated therein.

In a single-lens reflex camera comprising a pentaprism incorporated therein, an anlge finder is attached to the rear of an eyepiece of the camera if it is desired to determine the area of sight held at waist level and viewed through the angle finder. In addition, if it is desired to accurately focus the center part of the area of sight, a magnifying lens system is commonly attached to the eyepiece of the angle finder so as to magnify the center part of the area of sight viewed through the angle finder. But, if it is deisred to accurately focus the center part of the area of sight after the area of sight has been determined by observing the subject through the angle finder, the angle finder must be removed from the eyepiece and then the magnifying lens system must be attached to the eyepiece. During this interchange between the angle finder and the magnifying lens system, a slight displacement of the subject to be photographed results in a necessity of re-attachment of the angle finder in order to determine the area of sight that will be included in the image. Such alternate use of the angle finder and the magnifying lens system is inconvenient and troublesome in handling the camera.

The object of the invention is to provide a compact angle finder with an adjustable magnifying lens system incorporated therein with which a desired high degree of magnification can be secured in a rapid and easy manner when it is desired to accurately focus the center part of the area of sight while it is observing it and conversely a desired low degree of magnification can be secured also in a rapid and easy manner if it is desired to determine the area of sight after its center part has been focussed with the high degree of magnifications.

A feature of the invention is the provision of a compact angle finder with an adjustable magnifying lens system incorporated therein, which is arranged at the rear of an eyepiece of a single-lens relfex camera finder and consists of a Galilean type rotatably adjustable magnifying lens system, an objective lens system including an air space in which is disposed a relfecting member, and an eyepiece lens system, and in which an entrance pupil of said adjustable magnifying lens system substantially coincides with an exit pupil of said eyepiece of the single-lens relfex camera finder, an exit pupil of said adjustable magnifying lens system is located within a range which is about one-half the overall length of said adjustable magnifying lens system from the center of rotation thereof and at the same time said exit pupil coincides with an entrance pupil of a lens system consisting of said objective lens system and said eyepiece lens system.

For a better understanding of the invention, the same will be explained by reference to the accompanying drawings, in which:

FIG. 1 shows in cross-section an angle finder with an adjustable magnifying lens system according to the invention illustrating a manner by which the magnifying lens system may be used with a high degree of magnification;

FIG. 2 shows the same cross-section as FIG. 1 illustrating a manner by which the magnifying lens system may be used with a low degree of magnification;

FIG. 3a shows in cross-section an adjustable magnifying lens system according to the invention provided with diaphragms and used with a high degree of magnification; and FIG. 3b shows the same cross-section as FIG. 3a illustrating a state in which the adjustable magnifying lens system is rotated by 90° and used with a low degree of magnification.

Referring to the drawings, an angle finder with an adjustable magnifying lens system incorporated therein according to the invention is shown in FIG. 1 in which reference numeral 1 designates a Galilean type adjustable magnifying lens system adapted to be rotated so as to adjust its degree of magnification. The magnifying lens system 1 is provided at its front side with an entrance pupil E followed by an exit pupil E' located within the magnifying lens system 1. The magnifying lens system 1 may be rotated from its state of high degree of magnification shown in FIG. 1 by 90° to its state of low degree of magnification shown in FIG. 2. 2 shows an objective lens system consisting of two positive components bounding an air space in which is disposed a reflecting member 3 which may preferably be a mirror, reflecting prism or dachprism. If use is made of the mirror or reflecting prism as the reflecting member 3, an erect image whose left and right parts are reverse to those of the subject to be photographed may be produced, while if use is made of the dachprism as the reflecting member 3, an image whose left and right parts are coincident with those of the subject to be photographed may be produced. 4 is an eyepiece lens system composed of two positive components. The objective lens system 2 and the eyepiece lens system 4 constitute a telephoto lens system.

The angle finder with adjustable magnifying lens system 1 incorporated therein according to the invention has features that the exit pupil E' of the adjustable magnifying lens system 1 is located near the rotating center thereof, and that this exit pupil E' coincides with an entrance pupil of a lens system consisting of the objective lens system 2 and the eyepiece lens system 4. These features make it possible to make the rotatably adjustable magnifying lens system 1 extremely small in size, and as a result, the distance from the objective lens system 2 to the entrance pupil E of the adjustable magnifying lens system 1 becomes short. In this case, it is preferable to locate the exit pupil E' of the adjustable magnifying lens system within a range which is about one-half the overall length of the adjustable magnifying lens system 1 from the center of rotation thereof. If the exit pupil E' of the adjustable magnifying lens system 1 is located in front thereof and hence exceeds the above range, it is difficult to increase the degree of magnification. Conversely, if the exit pupil E' is located at the rear of the adjustable magnifying lens system 1 and hence also exceeds the above range, the distance between this exit pupil E' on the one hand and an entrance pupil of the adjustable magnifying lens system 1 when it is rotated by 90° and used with the low degree of magnification as shown in FIG. 2 on the other hand becomes long. As a result, the area of sight viewed through the angle finder becomes defective at its corners and reduced in its dimension. In addition, the objective lens system 2 is divided into two components spaced apart and bounding an air space in which is disposed the reflecting member 3. As a result, it is possible to shorten the distance from the reflecting member 3 to the entrance pupil E of the adjustable lens system. Moreover, if the exit pupil of the eyepiece of the signellens reflex camera finder substantially coincides with the entrance pupil E of the adjustable magnifying lens system 1, the camera as a whole becomes considerably compact.

As above described, if the angle finder with adjustable magnifying lens system 1 attached to the eyepiece of the single-lens reflex camera is rotated by 90° to make its optical axis perpendicular to the optical axis of the finder as shown in FIG. 2, it can operate as a low magnifying lens system, and as a result, it is possible to observe a large area of the sight through the angle finder. If necessary, the adjustable magnifying lens system 1 may be rotated again to the position shown in FIG. 1 at which it can operate as a high magnifying lens system whereby it can produce a larger image of the center of sight at a high degree of magnification which is equal to a product of a degree of magnification of the high magnifying lens system times a degree of magnification of the low magnifying lens system, and as a result, the center of sight can accurately be observed. Such alternate rotations of the adjustable magnifying lens system enable the determination of the area of sight viewed through the angle finder as well as the exact focusing operation to be effected in an extremely simple manner.

If the entrance pupil E of the high magnifying lens system is far distant away from the entrance pupil of the low magnifying lens system, the exit pupil E' of the high magnifying lens system becomes correspondingly far distant away from the exit pupil of the low magnifying lens system and hence the area of sight viewed through the angle finder becomes defected at its corners. Thus, it is necessary to move the eye's position in order to obviate such disadvantage. The position of the exit pupil E' of the adjustable magnifying lens system 1 as defined by the invention makes it possible to obviate the above mentioned user's disadvantage. The provision of diaphragms, however, as will be described, is capable of bringing about approachment between the entrance pupil E of the high magnifying lens system and the entrance pupil of the low magnifying lens system.

In FIGS. 3a and 3b are shown a diaphragm S located in front of the adjustable magnifying lens system 1 and another diaphragm S' secured to the base of the lens system 1 on the rotating surface thereof. In the high magnifying lens system shown in FIG. 3a, the center E of the diaphragm S coincides with the entrance pupil of the angle finder as a whole, while the entrance pupil of the adjustable magnifying lens system 1 coincides with the exit pupil E' thereof.

If the diaphragm S is made stationary and common to both the high and low magnifying lens systems, the entrance pupil of the low magnifying lens system in the rotated position shown in FIG. 3b is also located at the ceter E of the diaphragm S. As a result, the entrance pupil located at E' in FIG. 3c is shifted to E in FIG. 3b.

But, if the center E'' of the diaphragm S' coincides with the optical axis of the angle finder when the adjustable magnifying system 1 is rotated to the position shown in FIG. 3b, the entrance pupil E of the low magnifying lens system is shifted to the center E'' of the diaphragm S', and as a result, the distance from the entrance pupil E'' of the low magnifying lens system to the entrance pupil E' of the high magnifying lens system becomes extremely small.

The diaphragm S may be rotated together with the adjustable magnifying lens system 1 to the position S'', for example. The diaphragm S' may also be provided for the adjustable magnifying lens system 1 on the top thereof. In such a case, if the adjustable magnifying lens system 1 is rotated from its position shown in FIG. 3a to the position shown in FIG. 3b, the diaphragm S' becomes located to the rear of the optical axis P instead of the front thereof.

What is claimed is:

1. A compact angle finder for single-lens reflex cameras comprising a single-lens reflex camera and an angle finder arranged at the rear of an eyepiece of said single-lens reflex camera and consisting of a Galilean type rotatably adjustable magnifying lens system, an objective lens system divided into two positive components bounding an air space therebetween, a reflecting member disposed in said air space, and an eyepiece lens system composed of two positive components, both said objective lens system and said eyepiece lens system being arranged at the rear of said magnifying lens system, and in which an entrance pupil of said adjustable magnifying lens system substantially coincides with an exit pupil of said eyepiece of the single-lens reflex camera finder, an exit pupil of said adjustable magnifying lens system is located within a range which is about one-half the overall length of said adjustable magnifying lens system from the center of rotation thereof and at the same time said exit pupil coincides with an entrance pupil of a lens system consisting of said objective lens system and said eyepiece lens system.

2. A compact angle finder as claimed in claim 1, wherein said adjustable magnifying lens system is provided on its rotatable surface with a diaphragm whose center coincides with the optical axis of said angle finder when said adjustable magnifying lens system is rotated by 90°.

3. A compact angle finder with an adjustable magnifying lens system incorporated therein as claimed in claim 1, in which said adjustable magnifying lens system consists of a positive lens component and a negative lens component and is located in front of said objective lens system.

* * * * *